(12) United States Patent
de Oliveira Botelho et al.

(10) Patent No.: US 10,816,456 B2
(45) Date of Patent: Oct. 27, 2020

(54) SYSTEMS AND METHODS FOR RECONFIGURABLE POINT-OF-CARE DIAGNOSTICS

(71) Applicant: INTERNATIONAL BUSINESS MACHINES CORPORATION, Armonk, NY (US)

(72) Inventors: Andre de Oliveira Botelho, Sao Paulo (BR); Ricardo L. Ohta, Sao Paulo (BR); Mathias B. Steiner, Rio de Janeiro (BR); Jaione Tirapu Azpiroz, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 546 days.

(21) Appl. No.: 15/297,742

(22) Filed: Oct. 19, 2016

(65) Prior Publication Data
US 2018/0106759 A1    Apr. 19, 2018

(51) Int. Cl.
*G01N 1/00* (2006.01)
*G01N 21/27* (2006.01)
(Continued)

(52) U.S. Cl.
CPC ........ *G01N 21/27* (2013.01); *B01L 3/502715* (2013.01); *B01L 2200/143* (2013.01);
(Continued)

(58) Field of Classification Search
CPC ....................................................... G01N 1/00
See application file for complete search history.

(56) References Cited

U.S. PATENT DOCUMENTS 5,666,417 A     9/1997  Liang et al.
6,294,063 B1 *  9/2001  Becker ................ B01F 13/0076
                                                204/450
(Continued)

FOREIGN PATENT DOCUMENTS

EP         1856509 B1    12/2011
WO      WO2014047737     4/2014
(Continued)

OTHER PUBLICATIONS

Duveneck, et al.—"Planar waveguides for ultra-high sensitivity of the analysis of nucleic acids" Analytica Chimica Acta, Sep. 2002, vol. 469, Issue 26, pp. 49-61.
(Continued)

*Primary Examiner* — Jyoti Nagpaul
(74) *Attorney, Agent, or Firm* — Tutunjian & Bitetto, P.C.; Joseph Petrokaitis

(57) ABSTRACT

A reconfigurable point-of-care system, comprising an analysis device having one or more detection components to perform a diagnostic method on a sample, the sample being loaded on a microfluidic chip, wherein the analysis device provides identification information, an interface device coupled to the analysis device to provide a communication channel, and a reader unit coupled to the communication channel and having a processor to select the diagnostic method based on the identification information and reconfigure one or more components of the interface device based on the analysis device.

15 Claims, 6 Drawing Sheets

(51) Int. Cl.
  *B01L 3/00* (2006.01)
  *B03C 5/00* (2006.01)
  *G01N 21/78* (2006.01)
  *G01N 21/64* (2006.01)
  *B03C 5/02* (2006.01)

(52) U.S. Cl.
  CPC ... *B01L 2200/148* (2013.01); *B01L 2300/023* (2013.01); *B01L 2300/025* (2013.01); *B01L 2300/0816* (2013.01); *B01L 2400/0424* (2013.01); *B03C 5/005* (2013.01); *B03C 5/026* (2013.01); *B03C 2201/26* (2013.01); *G01N 21/6456* (2013.01); *G01N 21/78* (2013.01); *G01N 2021/6482* (2013.01); *G01N 2201/0221* (2013.01)

(56) References Cited

U.S. PATENT DOCUMENTS

| | | | |
|---|---|---|---|
| 8,795,523 | B2 | 8/2014 | Su et al. |
| 2004/0126279 | A1* | 7/2004 | Renzi ............... B01L 3/502715 422/502 |
| 2008/0144028 | A1 | 6/2008 | Gruler |
| 2014/0038222 | A1 | 2/2014 | Alt et al. |
| 2014/0199713 | A1 | 7/2014 | Quake et al. |
| 2014/0287527 | A1 | 9/2014 | Xiao |
| 2014/0342470 | A1 | 11/2014 | Su et al. |

FOREIGN PATENT DOCUMENTS

| | | |
|---|---|---|
| WO | WO2014070935 | 5/2014 |
| WO | WO2014207618 | 12/2014 |

OTHER PUBLICATIONS

Biotek Instruments Inc.—"FLx800 Fluorescence Reader" www.biotek.com, Copyrighted 2016, 2 Pages.

Breslauer, et al.—"Mobile Phone Based Clinical Microscopy for Global Health Applications" Mobile Phone Microscopy, Jul. 2009, vol. 4, Issue 7, e6320, 7 pages.

Cellmic LLC—"Holomic Introduces a Cellphone-Based Rapid Test Reader at AACC 2012" www.cellmic.com. Accessed Jun. 2016, 3 pages, Available at http://www.cellmic.com/content/recent-news/holomic-introduces-a-cellphone-based-rapid-test-reader-at-aacc-2012/.

Cellmic LLC—"Holomic Announces Re-Branding as CellMic" www.cellmic.com, Feb. 2016, 2 pages, Available al http://www.cellmic.com/content/uncategorized/holomic-announces-re-branding-as-cellmic/.

Cellmic LLC—"Fluorescent Imaging Cytometry and *E. coli* Detection on a Cell-phone" www.cellmic.com. Accessed Jun. 2016, Mobile Sensing & Diognastics/Imaging Cytometry, 1 page. Available at http://www.cellmic.com/content/fluorescent-imaging-cytometry-and-e-coli-detection-on-a-cell-phone/.

ETH Laboratory of Biosensors and Bioelectronics—"ZeptoREADER" www.lbb.eth.ch, Feb. 2013, 3 Pages, Available at http://www.lbb.ethz.ch/Equipment/zeptoreader.

Alere—"Alere Triage MeterPro" Product Details Oct. 2016, 12 Pages, Available at http://www.alere.com/en/home/product-details/triage-meterpro-us.html.

Faulstich et al.—"Handheld and portable test systems for immunodiagnostics, nucleic acid detection and more." Optics and Photonics in Global Homeland Security IV, Apr. 2008, Conference vol. 6945, 10 pages.

Zhu et al.—"Wide-field Fluorescent Microscopy on a Cell-phone" 33rd Annual International Conference of the IEEE EMBS, Sep. 2011, pp. 6801-6804.

Cellmic LLC—"Holomic Announces ReBranding as CellMic" Feb. 2016, 3 pages, Available at http://www.cellmic.com/content/uncategorized/holomic-announces-re-branding-as-cellmic/.

Laksanasopin, et al.—"A smartphone dongle for diagnosis of infectious diseases at the point of care" Science Translational Medicine (www.Sciencemag.org). Feb. 2015, vol. 7, Issue 273, 11 Pages.

Oncescu, et al.—"Cholesterol testing on a smartphone" Royal Society of Chemistry, Feb. 2014, Lab on a Chip, vol. 14, pp. 759-763.

Qiagen—"ESEQuant Lateral Flow Reader" www.qiagen.com, copyrighted 2013, 3 Pages, Available at https://www.qiagen.com/us/about-us/contact/oem-services/ese-instruments/esequant-lateral-flow-reader/?Print=1.

Gervais, et al.—"Toward one-step point-of-care immunodiagnostics using capillary-driven microfluidics and PDMS substrates" Royal Society of Chemistry-Lab on a Chip, Aug. 2009, vol. 9, No. 23, pp. 3330-3337.

Wei, et al.—"Fluorescent Imaging of Single Nanoparticles and Viruses on a Smart Phone" ACS Publications, Sep. 2013, vol. 7, No. 10, pp. 9147-9155.

Zeposens—"Zeptosens' protein microarrays: A novel high performance microarray platform for low abundance protein analysis" Proteomics, Apr. 2002, vol. 2, pp. 383-393.

* cited by examiner

SYSTEMS AND METHODS FOR RECONFIGURABLE POINT-OF-CARE DIAGNOSTICS

CROSS REFERENCE TO RELATED APPLICATIONS

This application is related to Application No. 62/271,732, filed on Dec. 28, 2015, which is incorporated herein by reference in its entirety.

BACKGROUND

Technical Field

The present invention relates to point-of-care diagnostics, and more particularly to a reconfigurable point-of-care diagnostic device.

Description of the Related Art

Point-of-care diagnostics generally refers to diagnostic testing readily available to a patient at the point-of-care, such as when physicians deliver healthcare services to the patient and/or at the patient's convenience. Often, point-of-care diagnostics is accomplished through the use of low cost portable instruments employed in healthcare facilities or in the comfort of one's home which perform diagnostic testing and readily display diagnostic results, thereby reducing the amount of time needed for medical testing in laboratory settings and/or waiting for results. However, many devices capable of performing point-of-care diagnostics provide only a single type of diagnostic analysis, and usually do not provide active electronic circuitry to execute more sophisticated detection methods, such as dielectrophoresis (DEP) technology.

SUMMARY

In accordance with an embodiment of the present invention, a reconfigurable point-of-care system is provided. The system includes an analysis device having one or more detection components to perform at least one diagnostic method on a sample, the sample being loaded on a microfluidic chip, wherein the analysis device provides identification information, an interface device coupled to the analysis device to provide at least one communication channel, and a reader unit coupled to the at least one communication channel and having at least one processor to select the at least one diagnostic method based on the identification information and reconfigure one or more components of the interface device based on the analysis device.

In accordance with an embodiment of the present invention, a reconfigurable point-of-care system is provided. The system includes an analysis device having one or more detection components to perform at least one diagnostic method on a sample and a dielectrophoresis (DEP) signal generator to apply one or more excitations signals to at least one electrode coupled to a sample interface, the sample being loaded on a microfluidic chip and the sample interface being coupled to the microfluidic chip, wherein the analysis device provides identification information, an interface device coupled to the analysis device to provide at least one communication channel, and a reader unit coupled to the at least one communication channel and having at least one processor to select the at least one diagnostic method based on the identification information and reconfigure one or more components of the interface device based on the analysis device.

In accordance with an embodiment of the present invention, a method is provided for performing point-of-care diagnostic testing. The method includes coupling an analysis device to a reader unit by an interface device, wherein the interface device provides a communication channel between the analysis device and the reader unit, receiving, at the reader unit, identification information associated with the analysis device, selecting a diagnostic method from a plurality of diagnostic methods based on the identification information, wherein each of the plurality of diagnostic methods includes instructions to perform at least one diagnostic test, reconfiguring one or more components of the interface device based on the diagnostic method, and performing the diagnostic method on a sample, the sample being loaded on a microfluidic chip.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
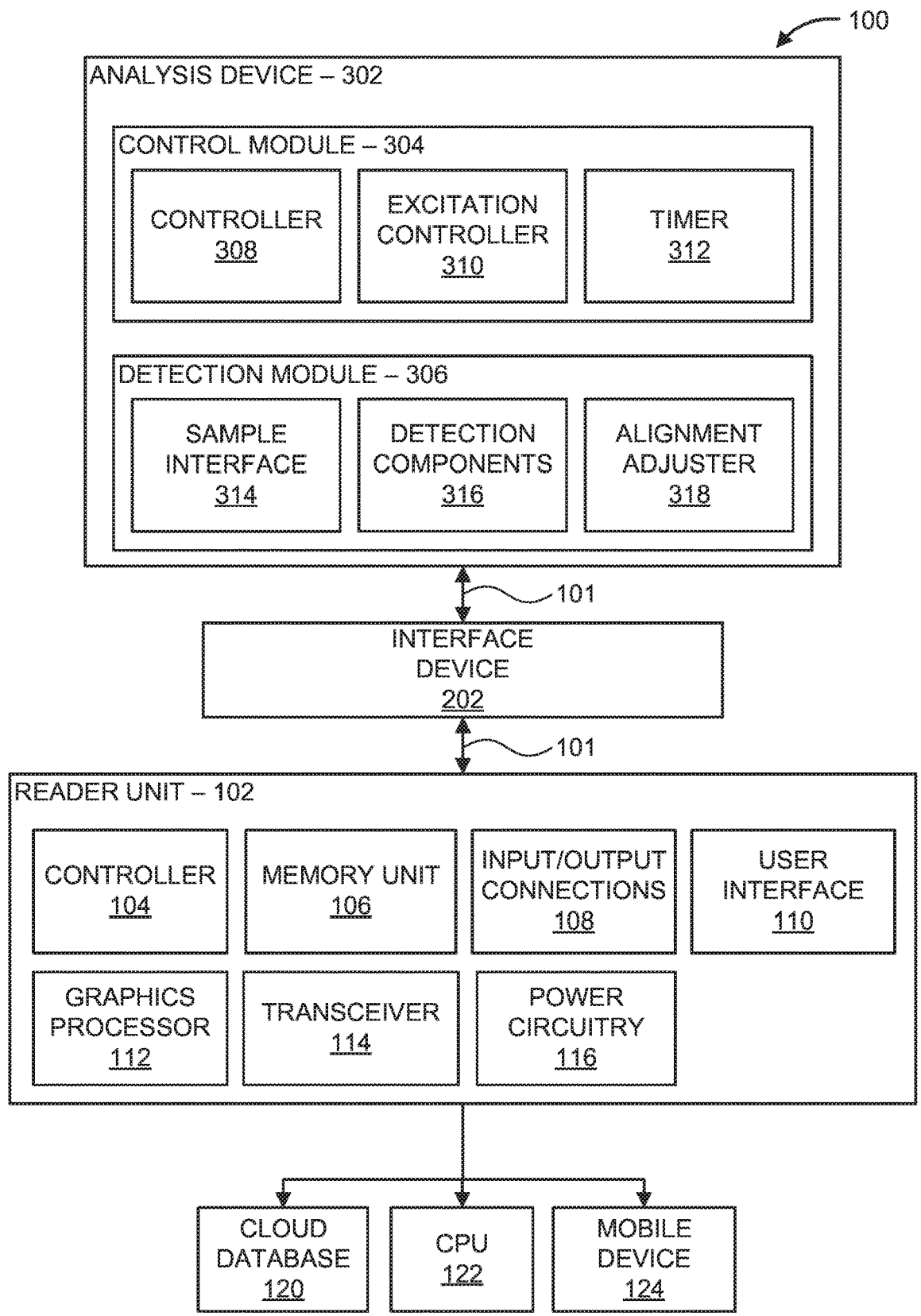
FIG. 1 is a block/flow diagram of a reconfigurable point-of-care diagnostic system in accordance with an embodiment of the present invention.

The present invention is directed to systems and methods for a reconfigurable point-of-care diagnostic device. In an embodiment, the device is be portable and reconfigurable such that multiples diagnostic operations, diagnostic analyses, and/or different diagnostic methods and/or tests can be employed. In some embodiments, the systems and methods described herein can employ fluorescence analysis and/or colorimetric analysis using microfluidic chips and/or electrokinetic technology, such as dielectrophoresis (DEP), electrowetting (EW) or electro-osmosis (EO) technology.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that the present invention will be described in terms of a given illustrative architecture; however, other architectures, structures, substrate materials and process features and steps can be varied within the scope of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, a block/flow diagram of a reconfigurable point-of-care diagnostic device 100 is illustratively depicted. Point-of-care (PoC) devices provide a cost effective and portable solution to execute in-loco tests and/or exams for multiple applications, such as fluorescence analysis. Typically, fluorescence analysis is performed using fluorescence microscopes, which are expensive and bulky and therefore not suitable for low cost PoC applications. The PoC device 100 is portable and can be reconfigurable such that multiples diagnostic operations, diagnostic analyses, and/or different diagnostic methods and/or tests can be employed. For example, the PoC device 100 can perform, but is not limited to, impedance detection, fluorescence imaging, colorimetric analysis and/or magnetic variation analysis. Accordingly, the PoC device 100 has a smaller equipment footprint than other laboratory testing devices, thereby making the PoC device 100 suitable for portable sensing applications (e.g., PoC testing).

In an embodiment, the PoC device 100 includes a reader unit 102, an interface device 202, and an analysis device 302. The reader unit 102 can be coupled to the analysis device 302 using the interface device 202 and/or bi-directional communication buses 101. The interface device 202 can include a power bus (not shown), one or more communication buses 101, and/or one or more general analog/digital input/output devices (not shown) to provide mutual communication and/or a power source between the reader unit 102 and the analysis device 302, as will be described in further detail below. In an embodiment, the reader unit 102 is reconfigurable depending on the analysis device 302 employed. For example, the reader unit 102 can perform fluorescence imaging when the analysis device 302 includes components to execute fluorescence imaging technology.

Similarly, the reader unit 102 can perform colorimetric analysis when the analysis device 302 includes components to execute colorimetric analysis. In some embodiments, the reader unit 102 can perform other analysis techniques, such as impedance or magnetic based analysis.

In an embodiment, components of the PoC device 100 can include various dimensions so as to enable the PoC device 100 to be portable. For example, the reader unit 102 can include the following dimensions, specifically 10 centimeters (cm) in width, 7 cm in depth, and 3 cm in height. In addition, the analysis device 302 can include the following dimensions, specifically 9 cm in width, 4.1 cm in depth, and 4.5 cm in height, such as when a fluorescence imaging device is employed.

The reader unit 102 can include a controller 104, such as one or more processors, microcontrollers, System-on-a-chip (SoC), etc. In an embodiment, the controller 104 can establish a communication channel between the reader unit 102 and one or more devices, such as the analysis device 302. For example, the controller 104 can provide device "handshaking" between the reader unit 102 and the analysis device 302. Generally, handshaking is an automated process of negotiation that dynamically sets and physically establishes parameters of a communication channel between two entities (e.g., the reader unit 102 and the analysis device 302) and enables continuous communication and/or information transfer over the channel.

For example, the reader unit 102 can be connected to the analysis device 302 using the interface device 202. In an embodiment, the controller 104 generates a request to the analysis device 302 for identification information corresponding to the analysis device 302. Identification information can include, but is not limited to, name of analysis device 302 (e.g., "Fluo module", "Colorimetric module", etc.), type of analysis device 302 (e.g., fluorescence imaging device, colorimetric analysis device, etc.), version of modules and/or software employed in the analysis device 302 (e.g., version 1.2, version 2.3, etc.), etc. A secondary controller on the analysis device 302, such as controller 308, provides the controller 104 with the requested identification information. Upon receipt of the identification information, the controller 104 reconfigures the reader unit 102 by loading the user interface 110, such as a display unit, with suitable menu options (e.g., buttons, graphical interface, etc.) and/or analysis procedures (e.g., diagnostic methods) based on the identification information of the analysis device 302. The menu options and/or diagnostic methods, which include instructions to perform one or more diagnostic tests, can be stored in memory unit 106. Accordingly, the reader unit 102 automatically detects and identifies the analysis device 302 and provides appropriate commands/instructions to a user through the user interface 110, such commands and/or instructions being particular to a diagnostic method selective to the analysis device 302.

In an embodiment, the controller 104 selects a diagnostic method, including one or more instructions to perform the diagnostic method, based on the identification information of the analysis device 302 and reconfigures input/output connections 108 (e.g., input/output pins) coupled to the analysis device 302 such that only appropriate commands and/or instructions are transmitted to/from the analysis device 302. For example, the memory unit 106 includes a database storing a plurality of diagnostic methods having instructions/commands to perform each diagnostic method including, but not limited to, custom-made menus for each application, testing, calibration and/or analysis methods for impedance detection, fluorescence imaging, colorimetric analysis and/or magnetic variation analysis. The controller 104 selects a diagnostic method based on the identification information provided by the analysis device 302. For example, the controller 104 can select a fluorescence imaging method when the analysis device 302 and/or identification information includes fluorescence imaging technology and/or a fluorescence imaging device.

In an embodiment, the controller 104 selects and reconfigures appropriate input/output connections 108 to be utilized between the reader unit 102 and the analysis device 302. For example, the controller 104 selects the input/output connections 108 based on the identification information of the analysis device 302 and/or the selected diagnostic method. In some embodiments, the analysis device 302 can employ one or more input/output connections of the reader unit 102. For example, the analysis device 302 can be powered by power circuitry 116 of the reader unit 102 such that an additional power source at the analysis device 302 is not needed. The power circuitry 116 can include, for example, an AC/DC converter, DC/DC converter, voltage regulator, battery circuitry, rechargeable battery unit (e.g., lithium-ion battery), or combination thereof. Accordingly, power circuitry 116 can provide a power source to the reader unit 102 and/or analysis device 302 through the interface device 202. The controller 104 can select the input/output connections 108, such as number of Digital and/or Analog pins to be used, based on the identification information of the analysis device 302 and/or selected diagnostic method.

In some embodiments, the controller 104 generates commands and/or instructions via the bus line 101 (e.g., communication channel) to the analysis device 302 to perform one or more functions of the selected diagnostic method. The one or more functions can include, for example, performing one or more steps of impedance detection, fluorescence imaging, colorimetric analysis and/or magnetic variation analysis. In some embodiments, the user interface 110 sends commands to the controller 104 to initiate performance of diagnostic testing and/or diagnostic analysis via the diagnostic method. For example, the user interface 110 can provide buttons and/or other mechanisms for the a user to interact with the reader under 102 and/or analysis device 302 to activate the diagnostic method and/or steps of the diagnostic method via controller 104 and/or controller 308.

The reader unit 102 includes a user interface 110, such as a touchscreen interface or display unit, and/or a graphics processor 112. In some embodiments, the user interface 110 and/or graphics processor 112 generates and/or displays commands and/or results of diagnostic testing and/or analysis, analysis status messages (e.g., "complete", "error", etc.) and/or configuration setup menu screens to provide additional configuration commands to further reconfigure the reader unit 102 based on the analysis device 302.

In an embodiment, the reader unit 102 includes a transceiver 114 to communicate with one or more remote devices, such as a cloud database 120, a computer processing unit (CPU), and/or a mobile device 124 (e.g., cellular telephone, tablet, etc.). For example, the transceiver 114 transmits and/or transfers diagnostic data (e.g., optical data, fluorescence data, impedance data, etc.) detected by the analysis device 302 to the cloud database 120, computer processing unit (CPU) 122, and/or mobile device 124 using a communications platform and/or a wireless protocol, such as WirelessHART®, ZigBee®, Bluetooth®, 6LoWPAN, or Wi-Fi®, wired connections, input/output ports, universal serial bus (USB), and/or mobile telecommunication technology (e.g., third generation mobile telecommunication technology (3G), fourth generation mobile telecommunication technology (4G), Long-Term Evolution (LTE) wireless communication technology, etc.).

In an embodiment, the PoC device 100 includes an interface device 202. The interface device 202 includes a mechanical and/or electrical interface that provides a connection between the reader unit 102 to the analysis device 302. In an embodiment, the interface device 202 provides a data communication line, such as a bi-directional bus line 101, between the reader unit 102 and the analysis device 302. In some embodiments, the interface device 202 provides power connections and/or input/output communication buses between the reader unit 102 and the analysis device 302, which will be described in further detail below.

The PoC device 100 includes an analysis device 302. The analysis device 302 can be a replaceable and/or insertable unit configured to perform one or more diagnostic procedures (e.g., diagnostic methods). For example, the analysis device 302 can perform fluorescence imaging/analysis, colorimetric analysis, impedance analysis, and/or magnetic variation analysis. In some embodiments, the analysis device 302 includes a control module 304 and a detection module 306 to perform one or more instructions/commands received by the controller 104 and/or controller 308. For example, the control module 304 includes one or more controllers 308, such as a processor, microcontroller, SoC, etc., to perform device handshaking between the reader unit 102 and the analysis device 302. Accordingly, the controller 308 can receive and transmit identification information to the reader unit 102 when the reader unit 102 and the analysis device 302 are coupled. In an embodiment, the controller 308 performs one or more instructions/commands by the controller 104 and/or controller 308 based on the selected diagnostic method, such as initiating one or more steps of the selected diagnostic method.

The detection module 306 includes a sample interface 314 coupled to a sample (not shown). For example, a sample can be provided on a microfluidic chip (not shown) which can be inserted into the analysis device 302 such that the detection module 306 examines and/or monitors a detection/analysis area of the sample. The sample interface includes, but is not limited to, one or more electrodes coupled to a microchannel embedded in the microfluidic chip. For example, the sample can be pipetted into and/or rest within the microchannel. In some embodiments, alignment structures (e.g., grooves, plates, flanges, etc.) within the analysis device 302 can be used to align the sample and/or the sample interface on a platform with the components of the detection module 306, such as detection components 316, as will be described in further detail below.

The detection components 316 can include, but are not limited to, one or more sensors (e.g., optical/electrical, magnetic, etc.) and/or optical components (e.g., lens, filters, cameras, photodetectors, light-emitting diodes (LEDs), etc.). In some embodiments, the detection components 316 include optical sensors, electronic sensors, magnetic sensors, etc. The detection components 316 examine and/or monitor the detection/analysis area on the microfluidic chip for impedance detection, fluorescence imaging, colorimetric analysis and/or magnetic variation analysis, etc. In some embodiments, the detection components 316 detect optical, magnetic and/or electrical data, such as fluorescence measurements, impedance/capacitance measurements (e.g., changes in impedance), etc.

Generally, a microfluidic chip refers to a device containing one or more channels (e.g., microchannels) for the transport of fluid in the micro or nano scale and is often employed to carry out chemical reactions, screen/mix substances or transport or manipulate micro particles (such as cells and/or microbeads) in a fluid flow. For example, microfluidic chips can be used to perform diagnostic immunoassays by detecting and/or measuring the presence of specific proteins, such as antigens or antibodies, facilitated by the use of markers, such as fluorescent dyes or magnetic micro/nanoparticles.

The microfluidic chip can include one or more channels etched into a substrate (e.g., glass, polymer such as Polymethyl methacrylate—PMMA, photoresist such as SU-8, silicon, etc.) which can be covered by a transparent film. The channels can have dimensions including approximately 2-200 μm deep, 10-100 μm wide, and a few millimeters long, although smaller channels with submicron or nanometer dimensions as well as larger channels of several millimeters are readily contemplated. A biological sample is inserted into the microfluidic channel using a pipette on a loading pad. Actuation of liquid flow can be implemented by external pressure sources (e.g., a syringe pump) or by capillary forces which force the biological sample down the channel of the microfluidic chip. Receptors on the microfluidic chip process the biological sample which can be read and/or analyzed by the detection components 316 using, for example, fluorescent imaging, colorimetric analysis, impedance measurements, etc.

In some embodiments, the detection module 306 includes an alignment adjuster 318 to align the sample, detection/analysis area and/or platform holding the sample with the detection components 316. The alignment adjuster 318 can include a motor, a lens to perform focal adjustment, and/or a fine tuning control magnetic setup comprising at least a pair of coils and permanent magnetics (e.g., an optical pickup focus mechanism) to perform in-plane adjustment. For example, the alignment adjuster 318 can alter a location of the platform holding the microfluidic chip, such as adjusting the location of the sample in various directions and/or angles. A zoom lens can include various lens elements which can be adjusted to modify focal length and/or angle/field of view of the sample area on the microfluidic chip.

In an embodiment, the analysis device 302 includes an excitation controller 310 to apply at least one electrokinetic signal (e.g., a dielectrophoresis (DEP) signal) to a sample interface 314. The sample interface 314 can include, for example, one or more electrodes coupled to the microfluidic channel and/or sample. The excitation controller 310 includes DEP-signal generation to generate electrical excitation in the sample interface 314 via the electrode(s). The DEP signal can include an AC signal (e.g., square wave, sinusoidal wave, etc.) that generates the DEP phenomena inside the microfluidics channel. For example, the at least one electrokinetic signal (e.g., DEP signal) generates DEP forces at various locations along the microchannel to concentrate and/or trap particles (e.g., beads having different sizes and/or different substances) in the sample for fluorescent measurement detection, change in impedance measurements, etc.

The analysis device 302 can include a timer 312. In some embodiments, the timer 312 initiates an experiment clock based on the selected diagnostic method. The experiment clock can be employed to initiate the experiment, monitor and/or follow a pre-determined sequence (e.g., pre-timed) of generation of the excitation signals and/or measurements during the diagnostic testing. In an embodiment, the timer 312 initiates measurements (e.g., fluorescent measurements, capacitance measurements, etc.), using the detection components 316, at fixed intervals and/or until a level of the detected measurements reaches a predefined saturation value and/or a maximum value/plateau. For example, the timer 312 measures optical data at fixed intervals of time, after a number of measurements have been detected, and/or when the optical data indicates a level of saturation has been reached.

In some embodiments, the systems and methods described herein can employ fluorescence analysis and/or colorimetric analysis using microfluidic chips and/or dielectrophoresis (DEP) technology. Dielectrophoresis is a phenomenon observed in the microscale whereby a force is exerted on an electrically neutral particle when it is subjected to a non-uniform electric field. The strength of the force depends on several factors including the relationship between medium and particle electrical permittivities, electric field gradient and the particles' shape and size, as well as the frequency of the electric field when AC signal is utilized. The use of DEP forces enables precise as well as flexible manipulation/screening of particles or organisms in micro/nanoscale with applications ranging from trapping or concentration to deflection and sorting. DEP techniques are compatible with a large range of fluids and/or particle/organisms, allowing for different analysis or functionality to be implemented within the same microfluidic chip simply by tuning the electric field applied to the fluid (e.g., sample).

Figure 2:
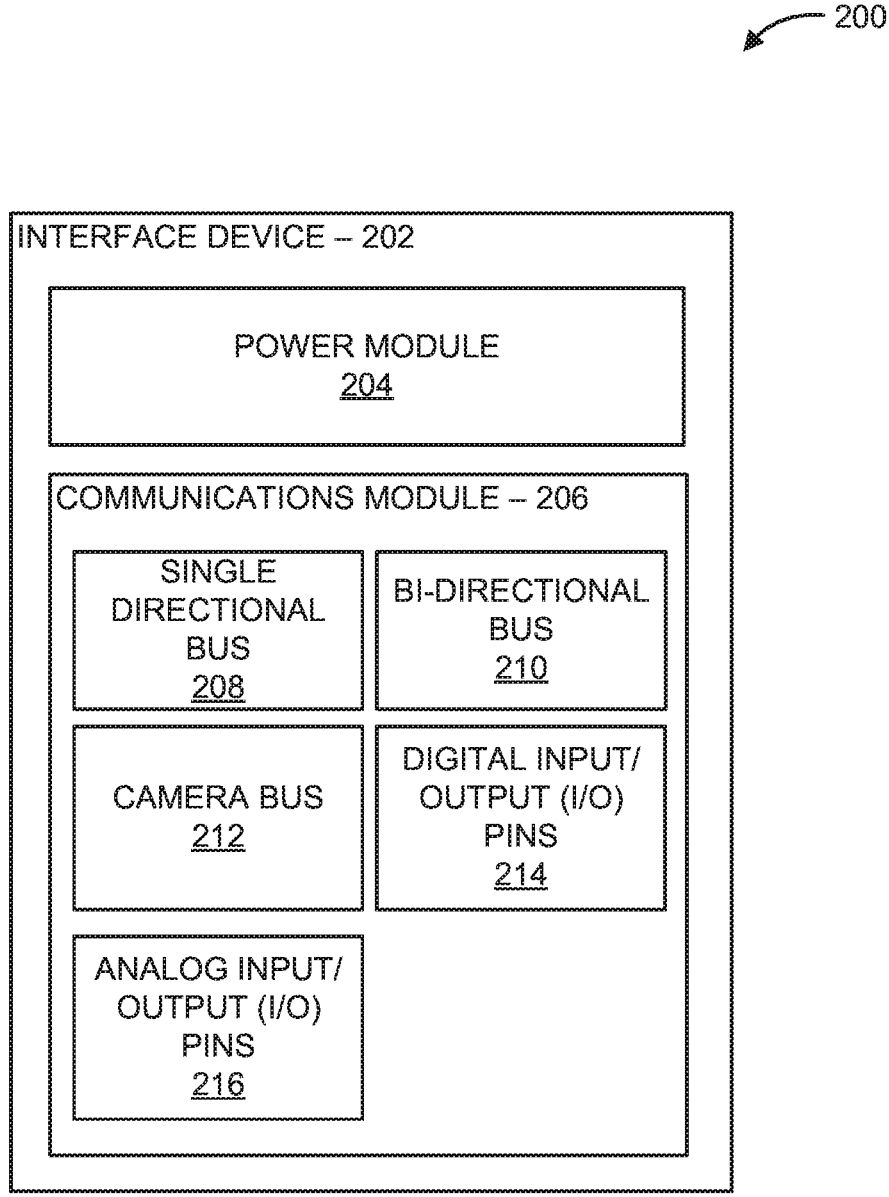
FIG. 2 is a block/flow diagram of a reconfigurable point-of-care diagnostic system in accordance with an embodiment of the present invention.

Now referring to FIG. 2, a detailed block/flow diagram of the interface device 202 is illustratively depicted. The interface device 202 includes a power module 204 and a communications module 206, each module having one or more channels. In an embodiment, the reader unit 102 activates one or more components of the interface device 202 based on the identification information of the analysis device 302 and/or selected diagnostic method to couple the reader unit 102 to the analysis device 302. Accordingly, the reader unit 102 individually selects one or more channels of the interface device 202 between the reader unit 102 and the analysis device 302. For example, the reader unit 102 can activate the power module 204, such as a positive supply voltage (e.g., VDD) and/or ground (GND) connections, to provide a power supply to the interface device 202 and/or analysis device 302. The analysis device 302 can, therefore, rely on the power circuitry 116 of the reader unit 102 to power the components of the analysis device 302. Accordingly, the analysis device 302 can be "powered" by the reader unit 102 and additional power supply sources on the analysis device 302 can be unnecessary.

In an embodiment, the reader unit 102 activates one or more components of the communications module 206 on the interface device 202 to establish/provide a communication channel to the analysis device 302, thereby coupling the reader unit 102 to the analysis device 302. For example, the communications module 206 can include a single directional bus 208, a bi-directional bus 210 (e.g., bus line 101), a camera bus 212, digital input/output (I/O) pins 214, analog input/output (I/O) pins 216, or combination thereof. In an embodiment, the controller 104 generates a reset signal and the single directional bus 208 transmits the reset signal to the analysis device 302 for reset purposes (e.g., hard reset of the controller 308).

The bi-directional bus 210 includes a bi-directional communication channel, such as bus line 101, such that commands/instructions, identification information, and/or measurements (e.g., optical data) can be transmitted/received between the reader unit 102 and the analysis device 302. In some embodiments, the bi-directional bus 210 includes an Serial Peripheral Interface (SPI), an Inter-Integrated Circuit ($I^2C$), etc.

In some embodiments, the communications module 206 includes a camera bus 212. The camera bus 212 can be configured to transmit images and/or video content when the analysis device 302 employs image-based and/or video-based data acquisition. In some embodiments, a camera bus 212 can be employed for multiplexing/high precision colorimetric/fluorescence analysis (e.g., single particle analysis) and autofocus/image adjustments, to optimize detection measurements. In some embodiments, the communications module 206 includes digital input/output pins 214 and/or analog input/output pins 214. For example, data acquisition can be monitored and/or measured using digital and/or analog sensors (e.g., chemical, pressure, temperature, position, flow, optical, sound, speed, acceleration, magnetic, electric, etc.), relay control signal and analog current/voltage communication.

Figure 3:
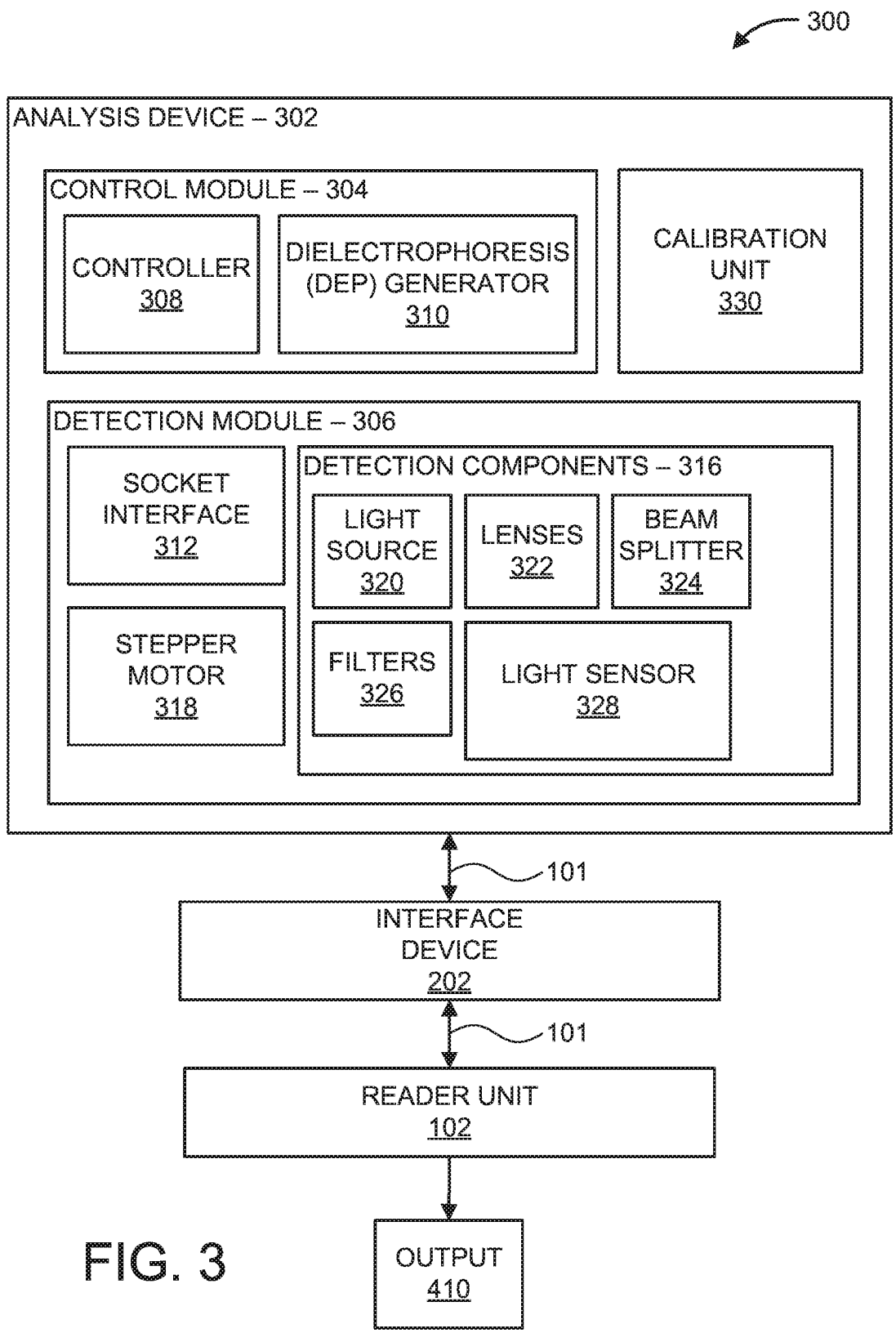
FIG. 3 is a block/flow diagram of a reconfigurable point-of-care diagnostic system in accordance with an embodiment of the present invention.

Referring now to FIG. 3, an exemplary block/flow diagram of a PoC device 300 is illustratively depicted. It should be noted that details associated with features and/or components of the reader unit 102 and interface device 202 have been omitted for redundancy, however such details can be provided with reference to descriptions associated with FIG. 1, as described above. In FIG. 3, the analysis device 302 can include a fluorescence imaging device to perform fluorescence imaging.

Fluorescence imaging can be used in multiple biological disciplines, such as a marker in the study of properties of organic and/or inorganic substances, cell analysis, analyte detection, etc. During fluorescence imaging, a specimen (e.g., sample) is illuminated with a light source having a specific wavelength which is absorbed by fluorophores in the sample. The fluorescent particles, or fluorophores, are molecules or proteins that absorb light in the specific wavelength and re-emit light in a second wavelength (e.g., a longer wavelength, lower energy irradiation, etc.) upon light excitation, phenomena which is called Stokes shift. During the lifetime of the excited state, the fluorophore can dissipate non-radiative energy due to environmental interactions (e.g., vibrations, heat, etc.), and can return to its ground state through the emission of a photon of energy. The excitation and emission spectral profiles can be separated by using, for example, a dichromatic mirror and/or an excitation/emission filter.

In some embodiments, the control module 304 includes DEP-signal generation, such as a dielectrophoresis (DEP) generator 310. For example, the diagnostic method can include one or more instructions to perform DEP generation. The DEP generator 310 generates electrical excitation (e.g., at least one electrokinetic signal) to the sample interface via one or more electrodes coupled to the sample. In some embodiments, the sample interface includes a socket interface 312. For example, the socket 312 includes a microfluidics electrode socket interface for dielectrophoresis, electrowetting, and/or electro-osmosis control signals with an extension of said electrode interface embedded inside the microchannel or in close proximity to the fluid/sample. In some embodiments, at least a pair of electrodes in the microchannels are connected to the DEP generator 310, which generates the DEP signal. The DEP signal provides, inside the microfluidic channel, an electric field gradient, which induces charge polarization inside the microbeads/microparticles of the sample.

In an embodiment, the controller 104 (not shown) of the reader unit 102 generates an instruction to the controller 308 of the analysis device 302 to generate/initiate the electrical excitation based on the selected diagnostic method. Accordingly, the DEP generator 310 generates at least one DEP excitation signal inside the fluid of the sample which induces a DEP force applied to one or more particles within the sample in the microfluidic chip. The controller 308 can reconfigure the DEP generator 310 to provide different DEP excitation signals by modifying the gain (e.g., signal amplitude ranging from units to tens of volts), frequency (e.g., DC to hundreds of MHz) and type of signal (e.g., sinusoidal, square, etc.).

In an embodiment, the detection measurement components 316 include one or more optical components, such as a light source 320 (e.g., laser diode), one or more lenses 322 (e.g., collimating lens, focusing lens, etc.), one or more beam splitters 324, one or more filters 326 (e.g., excitation filter, emission filter, etc.), and a light sensor 328 (e.g., camera/photodetector), or combination thereof. The light source 320 generates a light beam (not shown) which passes through an excitation filter 326 and beam splitter 324, located over the sample detection area of the microfluidic chip. The beam splitter 324 includes a mirror for excitation irradiation and can be transparent for emission irradiation. The excitation beam illuminates the sample area and a fluorescent/emission light beam (not shown) (e.g., emission light) can be generated in the sample area, due to the fluorescence phenomena, and can be received through an emission filter 326 and detected by the light sensor 328. The light sensor 328 detects one or more fluorescent measurements and/or optical data from the sample area. For example, the light sensor 328 detects at least one electromagnetic signal, the electromagnetic signal including measurements involving fluorescence, color, depending on the analysis device 302 and/or diagnostic method employed. In some embodiments, the analysis device 302 includes a stepper motor 318 to adjust alignment/position of the microfluidic chip and/or sample and/or execute fluorescence analysis in one or more locations of the microfluidics chip. In some embodiments, the fluorescent measurements are employed to detect analytes in the sample. In other embodiments, fluorescent measurements are employed to track the flow of particles in the microchannel, such as flow cytometry and particle image velocity (PIV) (e.g., microPIV).

In an embodiment, the analysis device 302 includes a calibration unit 330. The calibration unit 330 includes, for example, a printed circuit board (PCB). Generally, a PCB mechanically supports and/or electrically connects electronic components using conductive tracks, pads, and/or other features etched onto a non-conductive substrate. In some embodiments, the calibration unit 330 includes software executed by controller 308 based on the selected diagnostic method and can receive the detection measurement data (e.g., voltage output of a photodetector corresponding to the intensity of fluorescent radiation, optical data from an image capturing element in the form of pixel brightness value of an image, magnetic field intensity data from a magnetic sensor or electrical impedance measurements, etc.) from the detection components 316. The calibration unit 330 can perform statistical data analysis on the detection measurement data to calibrate a model (e.g., a calibrated model), such as a calibrated graph, table or curve, or the parameters of a regression model, describing the relationship between the detection measurement data and analyte concentration.

In some embodiments, the calibrated model provides a relationship between what is measured (e.g., fluorescent intensity, color, etc.) and a concentration of the analyte. A calibrated model can be generated for every different type of analyte. Once the relationship between the measurement data, such as fluorescence intensity, and analyte concentration is determined, such characteristics (e.g., concentration) can be easily determined for an unknown sample by looking at the fluorescence intensity of the unknown sample and applying such data in the calibrated model.

In some embodiments, detection measurement data obtained under known analyte concentrations and controlled experimental conditions can be used as calibration data to deduce the parameters of a model relating the detection measurement value and the analyte concentration level. The output of the analysis device 302 to an unknown concentration of analyte during normal device operation can represent an estimate of said unknown concentration based on the detection measurement data and can be determined by comparing the detection measurement data against the calibrated model. In some embodiments, the output of the analysis device can be a binary result, positive or negative, depending on whether the detection measurement value falls above or below a predefined value.

The result of the calibration are parameters that can be employed in a chosen calibrated model (e.g., polynomial fit, regression analysis, etc.). For example, polynomial regression can employ a linear equation, such as $y=a_0+a_1 x$ where y is the fluorescence intensity, x is the concentration and $a_0$ and $a_1$ are the model parameters obtained during calibration consisting of minimizing the difference $[y-(a_0+a_1 x)]$ for known values of fluorescence intensity y and concentration x. Other equations can be used, such as logarithm, exponential, Rodbard, etc. Once an equation that describes the relationship between fluorescence intensity and analyte concentration is determined, a calibration graph can be generated. Usually, during measurements, a fluorescence intensity value not covered by the standardized samples (e.g., those used to obtain the parameters of the calibrated model) used to obtain the model parameters is detected. The calibrated model can then be used to estimate the concentration of the analyte in the unknown sample.

For example, the calibration unit 330, which can include one or more processors, can generate a calibrated graph, table or curve and/or a regression model associated with the fluorescence measurements collected under known analyte concentration conditions, which can be displayed on a display device, such as the user interface 110, and/or transmitted to a remote device via output 410. In an embodiment, the calibrated chart can include the collected data plotted on an x-y graph, where fluorescence measurement (e.g., fluorescence intensity) can be plotted on the y-axis and analyte concentration can be plotted on the x-axis.

Calibration can be needed for each specific microfluidic chip design or functionality, including trapping mechanism, and/or target molecule. For example, a microfluidic chip and electrode design can separate larger beads from smaller beads in the sample, with the larger beads being deflected by DEP forces and concentrated in a separate chamber/microchannel segment on the microfluidic chip. Another microfluidic chip and electrode design can trap or immobilize beads suspended over interdigitated electrodes by use of DEP forces.

In some embodiments, the detection measurement data (e.g. fluorescence measurement) is indicative of the volume of DEP-trapped micro particles, with such values reaching saturation levels where no more particles can become trapped. In other embodiments, detection measurement data is indicative of analyte concentration in the sample under constant or saturation conditions of DEP-trapped particle volume. During calibration, several microfluidic chips having different analyte concentrations and operated under constant DEP-trapped particle volume conditions can be used as a known reference. Statistical distribution of the detection measurement data (e.g., florescence data) for the known references can be used to generate a calibrated graph, table or curve, or the parameters of a regression model, describing the relationship between the detection measurement data and the analyte concentration under such constant DEP-trapped particle volume conditions. This calibrated model can used by the analysis device 302 for comparison with detection measurement values of unknown analyte concentrations under the same constant DEP-trapped particle volume conditions, which can be compared with electromagnetic signals (e.g., detected measurement data such as fluorescence data) of unknown substances.

In some embodiments, the calibration unit 330 generates a regression model as output to be used by the analysis device 302 during operation to determine analyte concentration values from detection measurements. For example, the calibration unit 330 employs a logistic regression approach where the detection measurement data (e.g., fluorescence data) under known analyte concentration conditions is used to calibrate a model where the outcome is discrete. During calibration, the detection measurement data is divided into several categories, each category representing a range or bin of analyte concentration values within a discrete set. In an embodiment, the calibration unit 330 calculates a probability of the detection measurement value (e.g., fluorescence intensity), belonging to a certain category or bin.

For example, in one embodiment the detection measurement data includes fluorescence intensity measurements from the light sensor 328 signal output, and the measured data can be categorized into ranges of millivolts (mV)/pixel color composition and/or intensity. To obtain a quantitative measurement (e.g., concentration levels instead of a simple confirmation of presence of a target substance), calibration measurements can be obtained with several different samples of known concentrations of analyte. After several fluorescence values are determined, intervals/ranges can be set having a particular concentration level of the target substance. Intervals/bins can be employed due to variations of fluorescence signals due to mechanical alignment precision, variations in the number of trapped beads, etc.

In some embodiments, the calibration unit 330 can define a probability threshold level that determines whether the measured input/data belongs to certain category which can be used to determine a final outcome and/or diagnostics of the reader unit 302 (e.g., output 410). For example, the calibration unit 330 can employ the following logistic regression formula to determine the probability $P^{ci}(X)$ of a measured fluorescence signal X belonging to category or bin i among, in this case, four different bins:

$$P^{ci}(X) = \frac{e^{a_i + b_i X}}{1 + e^{a_i + b_i X}}, i = 1, 2, 3$$

$$P^{c4}(X) = 1 - \sum_i P^{ci}(X)$$

where $a_i$ and $b_i$ are coefficients of the logistic regression model $P^{ci}$ determined through numerical fitting to the calibration data from categories, in this example, i=1, 2, 3 respectively. A probability threshold level can be defined for each bin 1, for instance, $P^i$ such that if $P^{ci}(X) > P^i$, then the input signal X is considered to belong to bin i.

Figure 4:
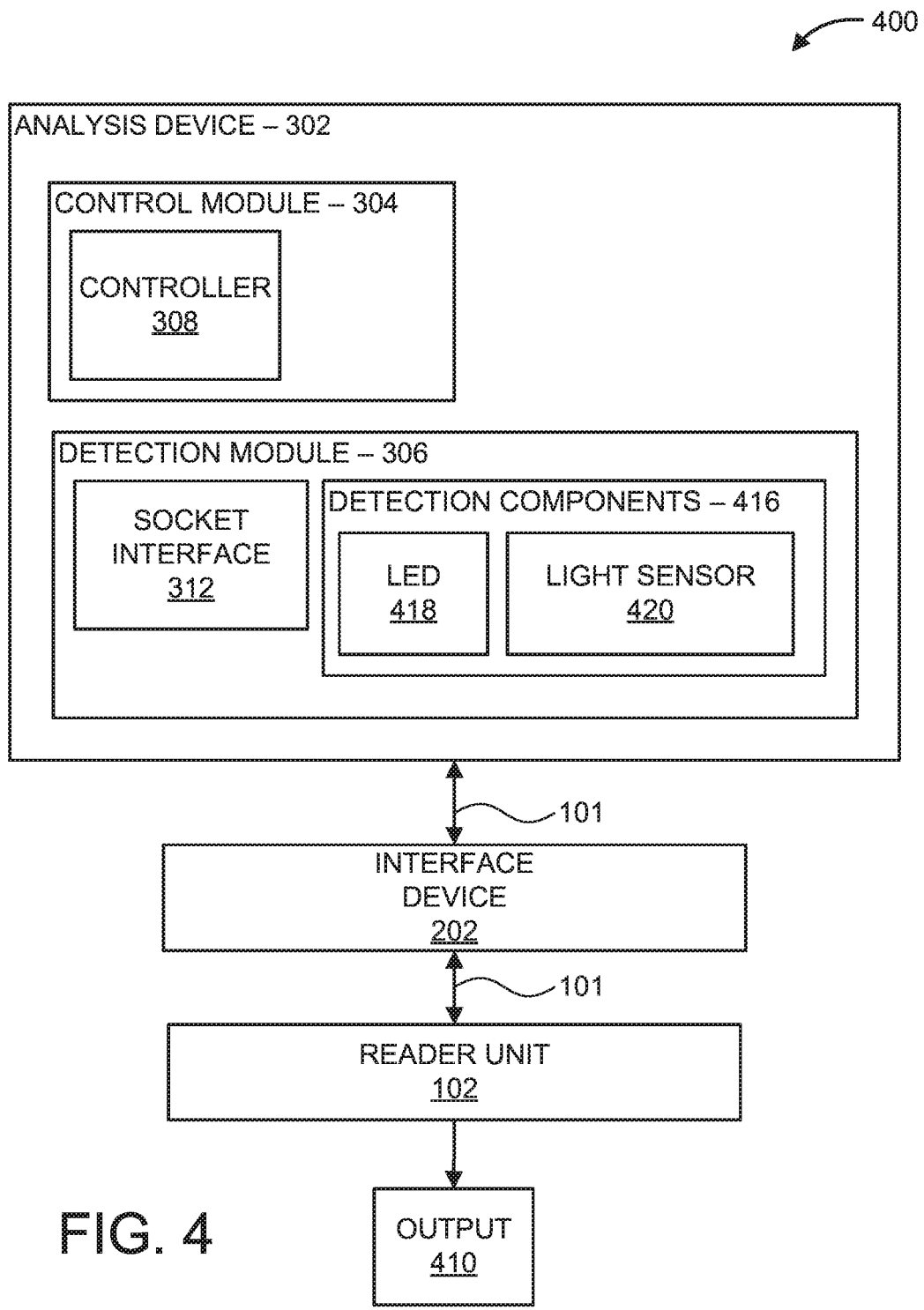
FIG. 4 is a block/flow diagram of a reconfigurable point-of-care diagnostic system in accordance with an embodiment of the present invention.

Referring now to FIG. 4, an exemplary block/flow diagram of a PoC device 400 is illustratively depicted. It should be noted that details associated with features and/or components of the reader unit 102 and interface device 202 have been omitted to avoid repetition, however such details can be provided with reference to descriptions associated with FIG. 1, as described above. The analysis device 302 can include a colorimeter to perform colorimetric analysis by measuring absorption/emission of particular wavelengths of light.

Colorimetric analysis is a method for determining a concentration level of a chemical substance present in a sample, often employing a color reagent. For example, a color reagent can be applied to a sample on a microfluidic chip to cause a chemical reaction between the sample and the color reagent that transforms any present colorless chemical compounds into a solute (e.g., colored derivative). The concentration and/or absorption properties of the solute can be detected by employing a colorimeter. The colorimeter includes a light source 418, a set of colored filters (not shown) to select a wavelength of light which the solute absorbs the most and/or an array of "monochromatic" LEDs, which could eliminate the need of color filters, and a light sensor 420 (e.g., photoresistor, photodiode, photodetector, etc.) to measure the emitted light from the sample. In some embodiments, the light source 418 and set of filters can be replaced with one or more light-emitting diodes (LEDs) having different colors, such as red, green, and blue.

In some embodiments, the detection module 306 includes one or more detection components 416, such as one or more light-emitting diodes (LEDs) 418 having different colors, such as red, green, and blue (RGB), and one or more light sensors 420. In an embodiment, the LED 418 emits white light/multicolor/multiwavelength irradiation on the sample, and the light sensor 420 detects at least one electromagnetic signals, such as one or more colors reflected/emitted from the sample (e.g., detected measurement data, optical data). The light sensor 420 detects the image color in RGB channels such that the relationship between these basic color channels provides a "fingerprint" of a substance in the sample and concentration levels corresponding to the substance. Examples of substances detected include amino acids (e.g., Arginine, Lysine, Histidine, etc.), enzymatic reactions (e.g., Cholesterol, Glucose, Urea, etc.) and non-enzymatic reactions (e.g., Calcium, Copper, Iron, etc.).

In some embodiments, calibration can be performed on the optical data due to illumination intensity variation and to determine known references. In some embodiments, the light sensor 420 detects absorption properties of the sample, given a specific wavelength of the excitation source (e.g., the LED 418). The detected measurement data can be output to the reader unit 102 and/or can be displayed on, for example, the user interface 110 and/or a display unit (not shown). In one embodiment, the optical data (e.g., output 410) can be wirelessly transmitted to one or more remote devices for further processing and/or data aggregation, such as a cloud database 120, a computer processing unit (CPU), and/or a mobile device 124 (e.g., cellular telephone, tablet, etc.), as illustrated in FIG. 1. In some embodiments, DEP technology can be implemented in the same way as in FIG. 3 with a fluorescence analysis embodiment, such as attaching a color marker in a protein and executing the reaction on a functionalized microbead surface. For example, color changes can be detected similar to fluorescence and magnetic using magnetometers, such as MEMS Resonant Magnetic sensors.

Figure 5:
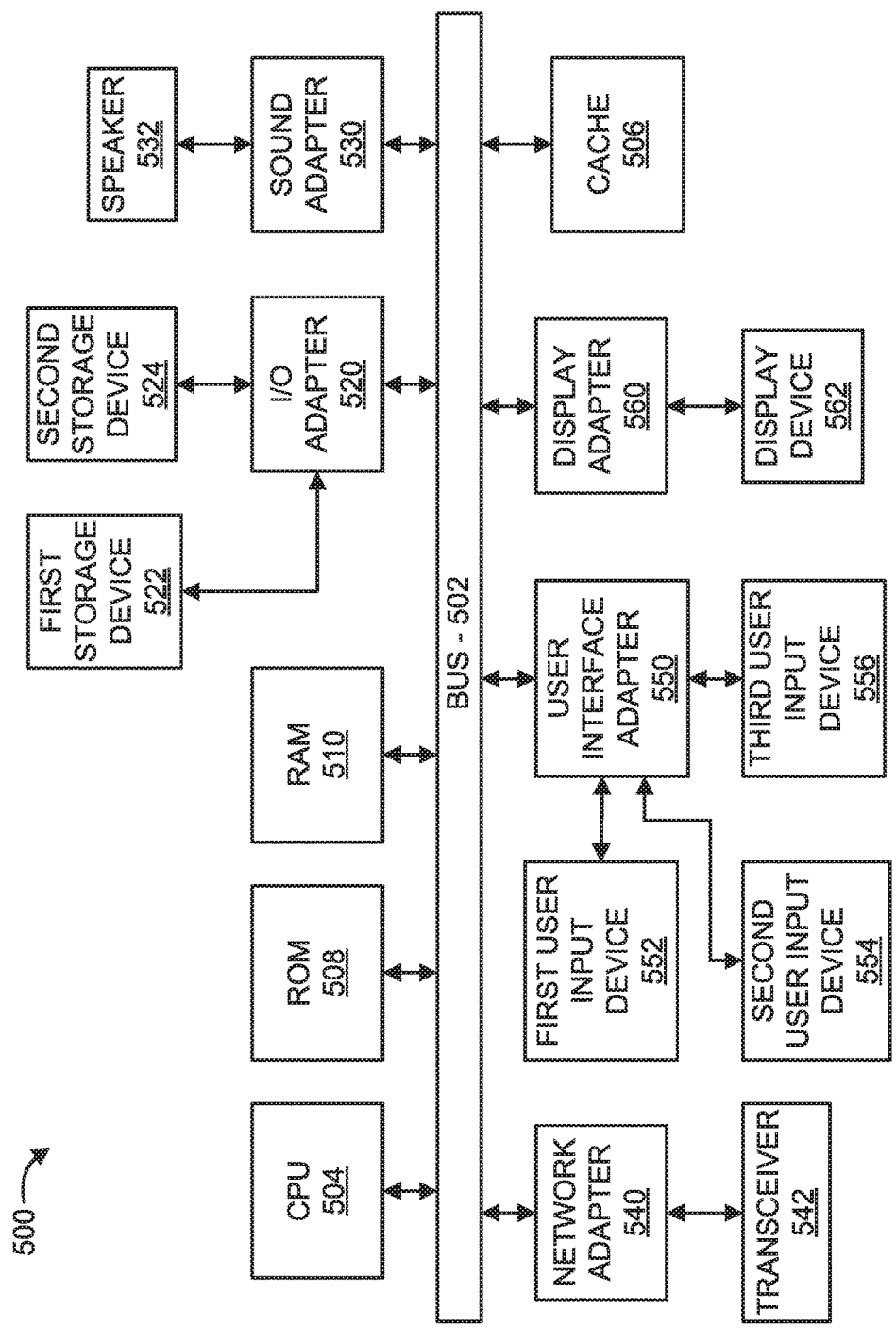
FIG. 5 is an exemplary processing system to which the present invention can be applied.

It is to be appreciated that system 100 described above with respect to FIG. 1, system 200 described above with respect to FIG. 2, system 300 described above with respect to FIG. 3, system 400 described above with respect to FIG. 4, and system 500 described below with respect to FIG. 5 are a system for implementing respective embodiments of the present invention. Part or all of processing system 100, 200, 300, and/or 400 can be implemented in one or more of the elements of system 500. Further, it is to be appreciated that processing systems 100, 200, 300, 400 and 500 can perform at least part of the method described herein including, for example, at least part of method 600 of FIG. 6.

Now referring to FIG. 5, an exemplary processing system 500 to which the present invention can be applied is illustratively depicted, in accordance with an embodiment of the present invention. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560. In an embodiment, the display device 562 displays the optical data, calibrated chart, analysis configuration menus and buttons, and/or regression model to a user.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Other types of input devices can also be used. The user input devices 552, 554, and 556 can be the same type of user input device or different types of user input devices. The user input devices 552, 554, and 556 are used to input and output information to and from system 500.

The processing system 500 can also include other elements (not shown). For example, various other input devices and/or output devices can be included in processing system 500, depending upon the particular implementation of the same. For example, various types of wireless and/or wired input and/or output devices can be used. Moreover, additional processors, controllers, memories, and so forth, in various configurations can also be utilized.

Figure 6:
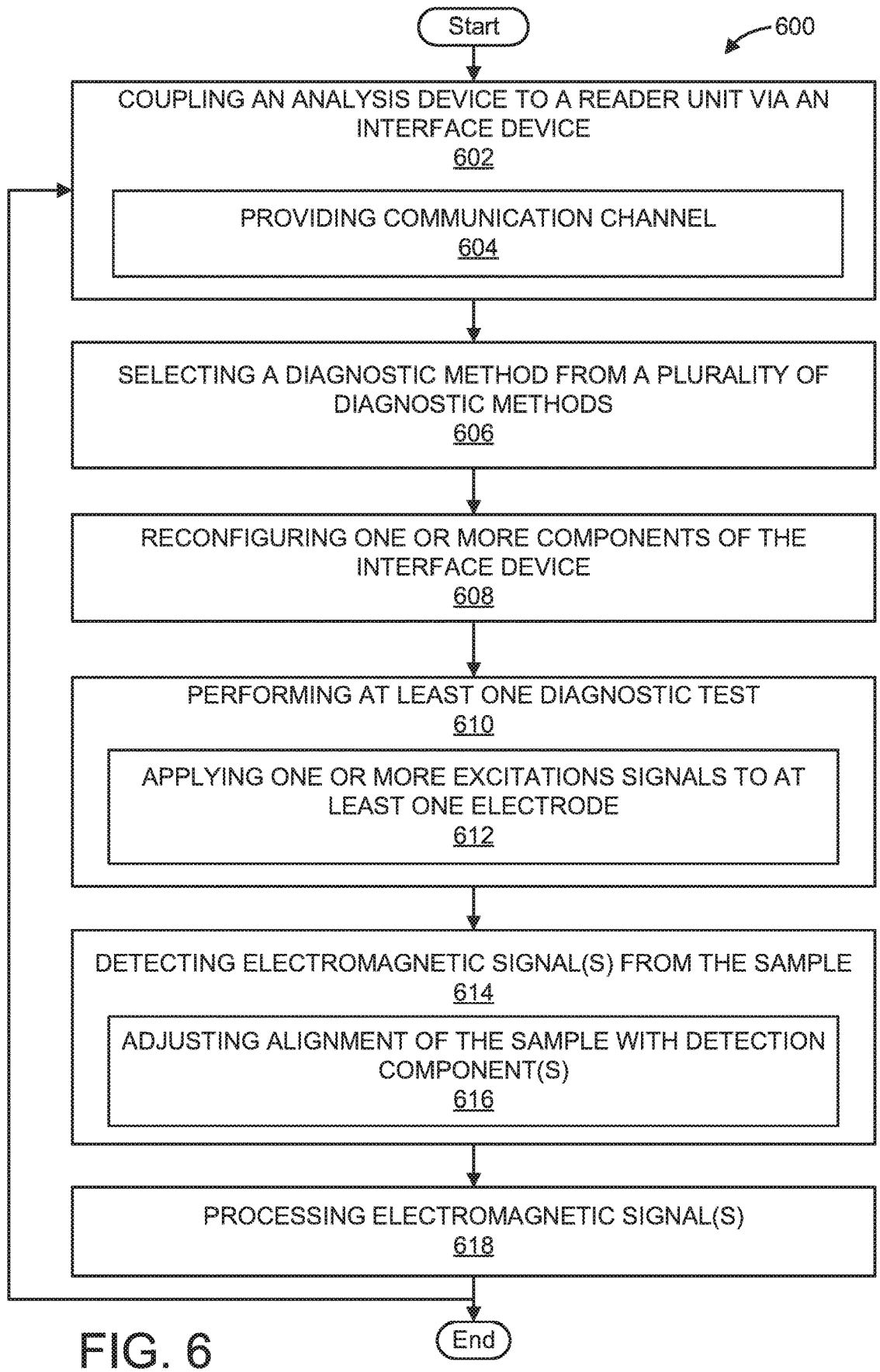
FIG. 6 is an exemplary method for performing diagnostic testing, in accordance with an embodiment of the present invention.

Now referring to FIG. 6, with continued reference to FIGS. 1-5, an exemplary method 600 for performing diagnostic testing is illustratively depicted, in accordance with an embodiment of the present invention.

Block 602 includes coupling an analysis device 302 to a reader unit 102 via an interface device 202. In some embodiments, coupling the analysis device 302 and the reader unit 102 includes providing a communication channel between the devices, such as a bi-directional bus line, as shown in block 604. For example, the reader unit 102 transmits a request to the analysis device 302 for identification information. In some embodiments, coupling the analysis device 302 and the reader unit 102 includes transmitting a request to the analysis device 302 to provide identification information associated with the analysis device 302, and receiving the identification information at the reader unit 102.

In block 606, the reader unit 102 selects a diagnostic method from a plurality of diagnostic methods based on the identification information. Each diagnostic method includes one or more commands/instructions to perform at least one diagnostic test including, for example, impedance detection, fluorescence imaging analysis, colorimetric analysis and/or magnetic variation analysis. In some embodiments, selecting the diagnostic method includes providing menu options (e.g., buttons, graphical interface, etc.) and analysis procedures (e.g., instructions) associated with the selected diagnostic method. Accordingly, extraneous menu options and/or instructions are avoided, and only instructions that are appropriate for the diagnostic method and/or analysis device 302 are provided.

Block 608 includes reconfiguring one or more components of the interface device based on the selected diagnostic method. For example, the one or more components of the interface device include a power bus, a camera bus, digital input/output pins, and/or analog input/output pins. Reconfiguring such components can include, for example, activating only those connections between the reader unit 102 and the analysis device 302 suitable to perform the selected diagnostic method.

In block 610, the method 600 includes performing the at least one diagnostic test on a sample. As described above, the sample can be loaded on a microfluidic chip. In some embodiments, performing the diagnostic test includes applying one or more excitation signals to at least one electrode coupled to a sample interface, which can include generating electrical signals to induce electrokinetic-force (e.g., DEP, electrowetting, electroosmosis, etc.) within channels of a microfluidic chip, as shown in block 612. The sample interface is coupled to a sample on a microfluidic chip. In some embodiments, applying one or more excitations signals includes periodically applying the one or more excitation signals at predetermined intervals.

In block 614, the method 600 includes detecting one or more electromagnetic signals corresponding to the sample using one or more detection components. For example, the electromagnetic signals can include a fluorescence signal using a photodetector and/or a voltage output and/or pixel RGB values/intensity. In an embodiment, the electromagnetic signals can include optical data such as absorption/emission in a given wavelength, absorption/emission relationship between different wavelengths, capacitance measurements, fluorescence measurements, etc.

In some embodiments, the method 600 includes adjusting the alignment of the sample and/or a chip platform holding the sample with the one or more detection components, as shown in block 616. For example, placement/alignment of the microfluidic chip can be adjusted. In another example, distance and/or focusing of a lens with the sample can be altered to ensure accurate measurements are detected.

In block 618, the method 600 includes processing the electromagnetic signals, such as performing data analysis on the one or more measurements, using at least one processor. For example, the analysis includes comparing the one or more measurements to a calibrated model, calibration graph, and/or regression model to determine unknown analyte concentrations in the sample. In some embodiments, processing the electromagnetic signals includes displaying a calibrated model on a display device and/or wirelessly transmitting the data and/or calibrated model to one or more remote devices. It should be understood that the blocks of 602-618 can be continuously repeated or can discontinue when diagnostic testing is no longer needed.

Having described preferred embodiments of a system and method for reconfigurable point-of-care diagnostics (which are intended to be illustrative and not limiting), it is noted that modifications and variations can be made by persons skilled in the art in light of the above teachings. It is therefore to be understood that changes can be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A reconfigurable point-of-care system, comprising:
   an analysis device having one or more detection components to perform at least one diagnostic method on a sample, the sample being loaded on a microfluidic chip, wherein the analysis device provides identification information associated with the analysis device;
   an interface device coupled to the analysis device to provide at least one communication channel;
   a reader unit coupled to the at least one communication channel and having at least one processor to select the at least one diagnostic method based on the identification information and reconfigure one or more components of the interface device based on the analysis device, the interface device being configured to provide secure device handshaking between the reader unit and the analysis device; and
   a controller configured for selecting and reconfiguring input output connections coupled to the analysis device based on the identification information such that only appropriate commands are transmitted to or from the analysis device.

2. The system of claim 1, wherein the one or more detection components is selected from the group consisting of a light source, one or more lenses, one or more beam splitters, one or more filters, a light sensor, and a light-emitting diode.

3. The system of claim 1, wherein the analysis device includes an excitation controller to apply one or more excitations signals to at least one electrode coupled to a sample interface, the sample interface being coupled to the sample on the microfluidic chip.

4. The system of claim 3, wherein the excitation controller includes a dielectrophoresis (DEP) signal generator.

5. The system of claim 3, wherein the analysis device includes a timer to apply the one or more excitations signals at predetermined intervals.

6. The system of claim 1, wherein the one or more detection components detects one or more electromagnetic signals associated with the sample, the one or more electromagnetic signals including detected measurement data selected from the group consisting of fluorescence measurements emitted by the sample, color measurements emitted by the sample, color measurements absorbed by the sample, impedance measurements, and magnetic measurements.

7. The system of claim 6, wherein the analysis device includes a calibration unit to classify the detected measurement data into at least one category of concentration values by comparing the detected measurement data with a calibrated model.

8. The system of claim 7, wherein the reader unit includes a display unit to visually display the detected measurement data.

9. The system of claim 1, wherein the one or more components of the interface device is selected from the group consisting of a power bus line, a camera bus, digital input/output pins, and analog input/output pins.

10. The system of claim 1, wherein the at least one diagnostic method includes one or more instructions to perform impedance detection, fluorescence imaging, colorimetric analysis or magnetic variation analysis.

11. A reconfigurable point-of-care system, comprising:
    an analysis device having one or more detection components to perform at least one diagnostic method on a sample and a dielectrophoresis (DEP) signal generator to apply one or more excitations signals to at least one electrode coupled to a sample interface, the sample being loaded on a microfluidic chip and the sample interface being coupled to the microfluidic chip, wherein the analysis device provides identification information associated with the analysis device;
    an interface device coupled to the analysis device to provide at least one communication channel;
    a reader unit coupled to the at least one communication channel and having at least one processor to select the at least one diagnostic method based on the identification information and reconfigure one or more components of the interface device based on the analysis device, the interface device being configured to provide secure device handshaking between the reader unit and the analysis device; and
    a controller configured for selecting and reconfiguring input output connections coupled to the analysis device based on the identification information such that only appropriate commands are transmitted to or from the analysis device.

12. The system of claim 11, wherein the one or more detection components is selected from the group consisting of a light source, one or more lenses, one or more beam splitters, one or more filters, a light sensor, and a light-emitting diode.

13. The system of claim 11, wherein the analysis device includes a timer to apply the one or more excitations signals at predetermined intervals.

14. The system of claim 11, wherein the one or more detection components detects one or more measurements associated with the sample, the one or more measurements being selected from the group consisting of fluorescence measurements emitted by the sample, color measurements emitted by the sample, color measurements absorbed by the sample, impedance measurements, and magnetic measurements.

15. The system of claim 11, wherein the at least one diagnostic method includes one or more instructions to perform impedance detection, fluorescence imaging, colorimetric analysis or magnetic variation analysis.

* * * * *